US012689848B2

(12) United States Patent
Verplaetse et al.

(10) Patent No.: US 12,689,848 B2
(45) Date of Patent: Jul. 21, 2026

(54) MULTI-RATE BURST-MODE RECEIVER

(71) Applicant: Nokia Solutions and Networks Oy,
Espoo (FI)

(72) Inventors: Michiel Verplaetse, Nazareth (BE);
Yannick Lefevre, Heverlee (BE)

(73) Assignee: Nokia Solutions and Networks Oy,
Espoo (FI)

( * ) Notice: Subject to any disclaimer, the term of this
patent is extended or adjusted under 35
U.S.C. 154(b) by 145 days.

(21) Appl. No.: 18/673,902

(22) Filed: May 24, 2024

(65) Prior Publication Data

US 2024/0397243 A1     Nov. 28, 2024

(30) Foreign Application Priority Data

May 25, 2023     (EP) ..................................... 23175520

(51) Int. Cl.
H04J 14/00          (2006.01)
H04Q 11/00          (2006.01)

(52) U.S. Cl.
CPC ..... H04Q 11/0066 (2013.01); H04Q 11/0067
(2013.01)

(58) Field of Classification Search
CPC ...... H04B 10/27; H04B 10/272; H04B 10/40;
H04B 10/691; H04B 10/0795; H04B
10/6971; H04B 10/6931; H04B 10/6932;
H04Q 11/0067; H04Q 11/0066; H04Q
11/0062; H04J 14/0282; H04J 14/0247;
H04J 14/0249; H04J 14/2045
USPC ...... 398/66, 67, 68, 69, 70, 71, 72, 79, 158,
398/159, 33, 38, 25, 26, 27, 202, 208,
(Continued)

(56) References Cited

U.S. PATENT DOCUMENTS

| | | | | |
|---|---|---|---|---|
| 8,503,891 B2 * | 8/2013 | Mashimo | ............ | H04L 25/0262 |
| | | | | 398/58 |
| 8,712,243 B2 * | 4/2014 | Chow | ................... | H04J 3/1694 |
| | | | | 398/67 |
| 2011/0129235 A1 * | 6/2011 | Le | ........................ | H04B 10/693 |
| | | | | 398/208 |

FOREIGN PATENT DOCUMENTS

| | | |
|---|---|---|
| JP | H09138716 A | 5/1997 |
| JP | 2008172665 A | 7/2008 |
| JP | 2010041610 A | 2/2010 |

OTHER PUBLICATIONS

Office Action for Japanese Application No. 2024-084611 dated Jul.
8, 2025.

* cited by examiner

*Primary Examiner* — Hanh Phan
(74) *Attorney, Agent, or Firm* — Brake Hughes
Bellermann LLP

(57)          ABSTRACT

Example embodiments describe an optical line terminal,
OLT, configured to communicate in a passive optical net-
work with one or more optical network units, ONUs. Optical
burst signals transmitted by the one or more ONUs have
respective symbol rates. The optical line terminal includes a
burst-mode receiver configured to decode an optical burst
signal from an ONU to a decoded output signal by one or
more digital signal processing circuitries that process a
signal at respective configurable processing rates. The opti-
cal line terminal is configured to perform obtaining the
symbol rate of a next optical burst signal; and adjusting,
during an interval between reception of valuable symbols
within a previous optical burst signal and reception of
valuable symbols within the next optical burst signal, the
configurable processing rate of one or more digital signal
(Continued)

processing circuitries based on the symbol rate of the next optical burst signal.

15 Claims, 7 Drawing Sheets

(58) Field of Classification Search
USPC ............ 398/209, 135, 136, 45, 48, 49, 155;
370/352, 392, 389, 468, 465
See application file for complete search history.

MULTI-RATE BURST-MODE RECEIVER

CROSS-REFERENCE TO RELATED APPLICATIONS

This application claims priority to and the benefit of China Patent Application No. 23175520.8 filed on May 25, 2023, the entire contents of each of which are incorporated herein by reference.

FIELD OF THE INVENTION

Various example embodiments relate to an apparatus and a method for managing a burst-mode receiver within an optical line terminal, OLT, in a passive optical network.

BACKGROUND OF THE INVENTION

In a passive optical network, PON, at least one optical line terminal, OLT, at the network side connects to one or more optical network units, ONUs, at the user side. An upstream optical burst signal received by the OLT is typically decoded by a burst-mode receiver comprising one or more burst-mode receiver components. Burst-mode receivers in emerging PON systems, e.g., 50G-PON according to the ITU-T G.9804 standard, typically comprise more complex digital burst-mode receiver components involving digital signal processing functions, e.g., an equalizer.

In these emerging PON systems, the ONUs may be allowed to transmit optical burst signals to the OLT at a plurality of different symbol rates. In other words, the symbol rate of the optical burst signals received by the OLT may vary. It can thus be desirable to enable efficient reception of optical burst signals with different symbol rates.

SUMMARY OF THE INVENTION

The scope of protection sought for various embodiments of the invention is set out by the independent claims. The embodiments and features described in this specification that do not fall within the scope of the independent claims, if any, are to be interpreted as examples useful for understanding various embodiments of the invention.

Amongst others, it is an object of embodiments of the invention to enable efficient reception and decoding of optical burst signals with different symbol rates by an optical line terminal, OLT, within a passive optical network, PON.

This object is achieved, according to a first example aspect of the present disclosure, by an optical line terminal, OLT, configured to communicate in a passive optical network with one or more optical network units, ONUs; wherein optical burst signals transmitted by the one or more ONUs have respective symbol rates; and wherein the optical line terminal comprises a burst-mode receiver configured to decode an optical burst signal from an ONU to a decoded output signal by means of one or more digital signal processing circuitries that process a signal at respective configurable processing rates. The optical line terminal comprising means configured to perform obtaining the symbol rate of a next optical burst signal; and adjusting, during an interval between reception of valuable symbols within a previous optical burst signal and the next optical burst signal, the configurable processing rate of one or more digital signal processing circuitries based on the symbol rate of the next optical burst signal.

The optical burst signals received by the OLT can thus have different symbol rates. The respective one or more ONUs in the network may transmit optical burst signals at respective predetermined symbol rates, i.e. the symbol rate of each ONU may be fixed. Alternatively, an ONU may transmit optical burst signals at different symbol rates. The burst-mode receiver within the OLT is configured to receive and decode the optical burst signals, thereby generating a decoded output signal. In other words, the burst-mode receiver processes or converts an optical burst signal to a decoded output signal. To this end, the burst-mode receiver comprises one or more digital signal processing circuitries that process a signal at respective configurable processing rates. A digital signal processing circuitry may refer to a burst-mode receiver component in a burst-mode receiver that includes at least one digital signal processing function. A configurable processing rate of a digital signal processing circuitry refers to the rate at which input samples are processed by the digital signal processing circuitry, and/or the rate at which output samples are generated by the digital signal processing circuitry.

The one or more digital signal processing circuitries are interconnected to form a sequence, a pipeline, or a combination such that the respective processing performed by the respective interconnected digital signal processing circuitries contributes to the decoding of an optical burst signal to a decoded output signal. In other words, the one or more digital signal processing circuitries form a processing data path for decoding an optical burst signal to a decoded output signal. Thus, the respective digital signal processing circuitries process an input signal to an output signal at a respective configurable processing rate. The input signal and/or the output signal of a digital signal processing circuitry is a digital signal. The burst-mode receiver may further comprise one or more burst-mode receiver components without configurable processing rate within the data path for decoding optical burst signals, e.g. a fixed-rate analogue burst-mode receiver component.

The next optical burst signal is the following optical burst signal that will be received by the OLT in time, i.e. the first subsequent optical burst signal. The previous optical burst signal is the most recently received optical burst signal by the OLT. In other words, the previous optical burst signal and the next optical burst signal are consecutive in time.

Valuable symbols within an optical burst signal are symbols associated with valuable burst data. Valuable symbols may include symbols corresponding to the payload of the optical burst signal, e.g. data, error correction data, parity data, control data, and idle data. Additionally, the valuable symbols may further include a portion of the symbols within a preamble, a portion of the symbols within a header, or the symbols within a delimiter of an optical burst signal. The positions of symbols within an optical burst signal that are considered valuable may be predetermined or provisioned, e.g. according to network requirements or the network protocol.

Adjusting the configurable processing rate of one or more respective digital signal processing circuitries based on the symbol rate of the next optical burst signal allows optimizing the digital signal processing circuitries for the symbol rate of the next optical burst signal. This has the advantage that the energy-efficiency of the burst-mode receiver, and thus the OLT, is improved as the digital signal processing circuitries can operate at an optimal processing rate for the received optical burst signal. In other words, it can be avoided that an optical burst signal is oversampled by the digital signal processing circuitries, which consumes futile energy. It is a further advantage that the respective configurable processing rates of the one or more respective digital signal processing circuitries can be adjusted in real time, i.e. between incoming optical burst signals.

Adjusting the configurable processing rate of one or more respective digital signal processing circuitries during the interval between reception of valuable symbols within consecutive optical burst signals further allows avoiding that valuable symbols are decoded incorrectly, as bits within the decoded output signal may be non-valid during a period following the adjusting of the configurable processing rate. This has the advantage that data loss and data alterations can be avoided when switching between configurable processing rates.

According to an example embodiment, the interval may comprise a guard time between a previous optical burst signal and a next optical burst signal; and/or a portion of a preamble within the next optical burst signal.

The interval between reception of valuable symbols within a previous optical burst signal and reception of valuable symbols within a next optical burst signal may thus include the guard time between two consecutive optical burst signals. The guard time is a time period that provides a safety margin against interference between consecutive optical burst signals. As such, no valuable burst data is received by the OLT during the guard time. Alternatively or complementary, a portion of the preamble within an optical burst signal may be substantially free of valuable burst data, e.g. an initial portion of the preamble may comprise samples for tuning the burst-mode receiver.

According to an example embodiment, adjusting the configurable processing rate of one or more digital signal processing circuitries may comprise adjusting a clock frequency of the one or more digital signal processing circuitries.

A clock signal may be applied to the respective one or more digital signal processing circuitries that causes them to operate at a respective clock frequency, i.e. causing the digital signal processing circuitries to process signals at a respective clock frequency or clock speed. In other words, the digital clock of the one or more digital signal processing circuitries may determine the configurable processing rate of the digital signal processing circuitries. As such, adjusting the clock frequency of a digital signal processing circuitry allows adjusting the respective configurable processing rate of the digital signal processing circuitry. This can be achieved by modifying the clock signal that is applied to the respective one or more digital signal processing circuitries, e.g. by means of a clock divisor circuitry.

According to an example embodiment, adjusting the configurable processing rate of a respective digital signal processing circuitry may comprise enabling and/or disabling one or more parallel circuitry instances of the respective digital signal processing circuitry.

In other words, a respective digital signal processing circuitry within the burst-mode receiver may include one or more parallel circuitry instances of said digital signal processing circuitry. The parallel circuitry instances may operate at a nominal clock speed or frequency, i.e. a fixed processing rate. Enabling or disabling these parallel circuitry instances in the signal data path thus allows to respectively increase or decrease the configurable processing rate of a respective digital signal processing circuitry, i.e. allows adjusting the configurable processing rate of the digital signal processing circuitry.

According to an example embodiment, the burst-mode receiver further comprises at least one down-sampling circuitry configured to down-sample a signal.

At least one down-sampling circuitry may thus be included in the processing data path of the burst-mode receiver for decoding an optical burst signal to a decoded output signal. Down-sampling may refer to converting a digital signal with a certain rate of samples to a digital signal with a lower rate of samples. The signal that is down-sampled may be an output signal of a preceding interconnected digital signal processing circuitry. This allows to match the rate of a signal with the configurable processing rate of the subsequent digital signal processing circuitries.

A down-sampling circuitry may, for example, be provided within the processing data path of the burst-mode receiver following a burst-mode receiver component that has a fixed processing rate. The means of the OLT may further be configured to perform controlling of the down-sampling circuitry according to the desired rate of the signal, e.g. by enabling the down-sampling circuitry, disabling the down-sampling circuitry, or modulating the amount of down-sampling. In other words, the down-sampling circuitry may be configurable.

According to an example embodiment, the burst-mode receiver further comprises at least one up-sampling circuitry configured to up-sample a signal.

At least one up-sampling circuitry may thus be included in the processing data path of the burst-mode receiver for decoding an optical burst signal to a decoded output signal. Up-sampling may refer to converting a digital signal with a certain rate of samples to a digital signal with a higher rate of samples. The signal that is up-sampled may be an output signal of a preceding interconnected digital signal processing circuitry. This allows to match the rate of a signal with the configurable processing rate of the subsequent digital signal processing circuitries.

An up-sampling circuitry may be provided at the end of the processing data path or pipeline, thereby allowing to up-sample a decoded output signal to a suitable rate for further circuitries within the OLT that are connected to the burst-mode receiver, e.g. higher-layer processing circuitries and/or interface circuitries within the OLT. Alternatively or complementary, an up-sampling circuitry may be provided prior to a burst-mode receiver component that requires an input signal having a predetermined sampling rate. The means of the OLT may further be configured to perform controlling of the up-sampling circuitry according to the desired rate of the signal that is up-sampled, e.g. by enabling the up-sampling circuitry, disabling the up-sampling circuitry, or modulating the amount of up-sampling. In other words, the up-sampling circuitry may be configurable.

According to an example embodiment, the burst-mode receiver further comprises at least one latency compensator circuitry configured to adjust a latency of a signal.

When adjusting the configurable processing rate of a digital signal processing circuitry, the latency or processing delay of the digital signal processing circuitry may vary. To this end, at least one latency compensator circuitry may be included in the processing data path of the burst-mode receiver. The signal to which the latency adjustment is applied may be an output signal of a preceding interconnected digital signal processing circuitry or an output signal of a preceding interconnected burst-mode receiver component. The latency compensator circuitry allows compensating for a change in latency when adjusting the configurable processing rate of one or more digital signal processing circuitries.

The at least one latency compensator circuitry may further allow compensating for a change in end-to-end latency of the burst-mode receiver. The end-to-end latency of the burst-mode receiver may refer to the processing time for decoding a symbol within the optical burst signal to one or more bits or samples within the decoded output signal. This has the advantage that the latency or processing delay of the burst-mode receiver can be controlled. This has the further advantage that the latency or processing delay of the burst-mode receiver can be substantially stable in time, i.e. remain constant, when adjusting the configurable processing rate of one or more digital signal processing circuitries.

The means of the OLT may further be configured to perform controlling of the latency compensator circuitry according to the desired latency, e.g. by enabling the latency compensator circuitry, disabling the latency compensator circuitry, or modulating the amount of latency adjustment. In other words, the latency compensator circuitry may be configurable.

According to an example embodiment, the latency compensator circuitry may further be configured to perform, during the interval between reception of valuable symbols within a previous optical burst signal and the next optical burst signal, inserting one or more dummy samples within a signal or dropping one or more non-payload samples from a signal.

The dummy samples and non-payload samples may be any unit of data depending on the signal upon which the latency adjustment is performed, e.g. dummy bits and non-payload bits; or dummy symbols and non-payload symbols. By inserting dummy samples or dropping non-payload samples, a change in end-to-end latency can be compensated without substantial system impact, e.g. without impacting further circuitries within the OLT that are connected to the burst-mode receiver. It is a further advantage that data loss and data alterations can be avoided when adjusting the latency, as the inserting of dummy samples or dropping of non-payload samples is performed during the interval which is substantially free of valuable burst data.

According to an example embodiment, the means may further be configured to perform controlling the at least one down-sampling circuitry, the at least one up-sampling circuitry, and/or the at least one latency compensator circuitry based on the symbol rate of the next optical burst signal.

According to an example embodiment, the optical line terminal may further be configured to perform scheduling a guard time between consecutive optical burst signals with a minimal length such that the decoded output signal comprises at least sufficient non-payload bits to compensate for a change in end-to-end latency of the burst-mode receiver associated with adjusting the configurable processing rate between a highest processing rate supported by the OLT and a lowest processing rate supported by the OLT.

According to an example embodiment, the up-sampling circuitry may further be configured to up-sample a signal to a predetermined data rate, or the latency compensator circuitry is further configured to adjust the latency of a signal to a predetermined latency.

The predetermined data rate or latency may be determined by the circuitry or processing block that receives the up-sampled signal or the latency-adjusted signal, e.g. a next analogue burst-mode receiver component within the data path, a next digital signal processing circuitry within the data path, or a further circuitry within the OLT such as a higher-layer processing circuitry, or an interface circuitry between the burst-mode receiver and a higher-layer processing circuitry.

According to an example embodiment, the one or more digital signal processing circuitries are selected from the group comprising an analogue-to-digital converter, a clock-and-data recovery device, an equalizer, and/or a decoder.

According to an example embodiment, the means of the OLT may further be configured to perform determining the interval between reception of valuable symbols within a previous optical burst signal and the next optical burst signal based on burst timing information of the optical burst signals.

The burst timing information may, for example, be an upstream transmission schedule that comprises timeslots during which the respective ONUs are allowed to transmit optical burst signals to the OLT.

According to an example embodiment, obtaining the symbol rate of the next optical burst signal may further comprise determining the symbol rate based on an upstream transmission schedule.

The upstream transmission schedule may be determined by the OLT. The OLT may assign a symbol rate to the upstream transmissions by the respective ONUs within the passive optical network. Alternatively or complementary, the OLT may assign received upstream transmissions, i.e. optical burst signals, to respective ONUs as part of an upstream transmission schedule. The OLT may be aware of a symbol rate that is assigned to the respective ONUs. This allows obtaining the symbol rate of the next optical burst signal.

According to a second example aspect, a method is disclosed comprising obtaining a symbol rate of a next optical burst signal; and adjusting, during an interval between reception of valuable symbols within a previous optical burst signal and the next optical burst signal, a configurable processing rate of one or more digital signal processing circuitries within an optical line terminal, OLT, based on the symbol rate of the next optical burst signal. The OLT is configured to communicate in a passive optical network with one or more optical network units, ONUs; and wherein optical burst signals transmitted by the one or more ONUs have respective symbol rates; and wherein the burst-mode receiver is configured to decode an optical burst signal from an ONU to a decoded output signal by means of one or more digital signal processing circuitries that process a signal at respective configurable processing rates.

According to a third example aspect, a computer-implemented method is disclosed comprising obtaining a symbol rate of a next optical burst signal; and adjusting, during an interval between reception of valuable symbols within a previous optical burst signal and the next optical burst signal, a configurable processing rate of one or more digital signal processing circuitries within an optical line terminal, OLT, based on the symbol rate of the next optical burst signal. The OLT is configured to communicate in a passive optical network with one or more optical network units, ONUs; and wherein optical burst signals transmitted by the one or more ONUs have respective symbol rates; and wherein the burst-mode receiver is configured to decode an optical burst signal from an ONU to a decoded output signal by means of one or more digital signal processing circuitries that process a signal at respective configurable processing rates.

According to a fourth example aspect, a computer program product is disclosed comprising computer-executable instructions for performing the steps according to the third example aspect when the computer program is run on a computer.

According to a fifth example aspect, a data processing system is disclosed configured to perform the computer-implemented method according to the third example aspect.

DETAILED DESCRIPTION OF EMBODIMENT(S)

Figure 1:
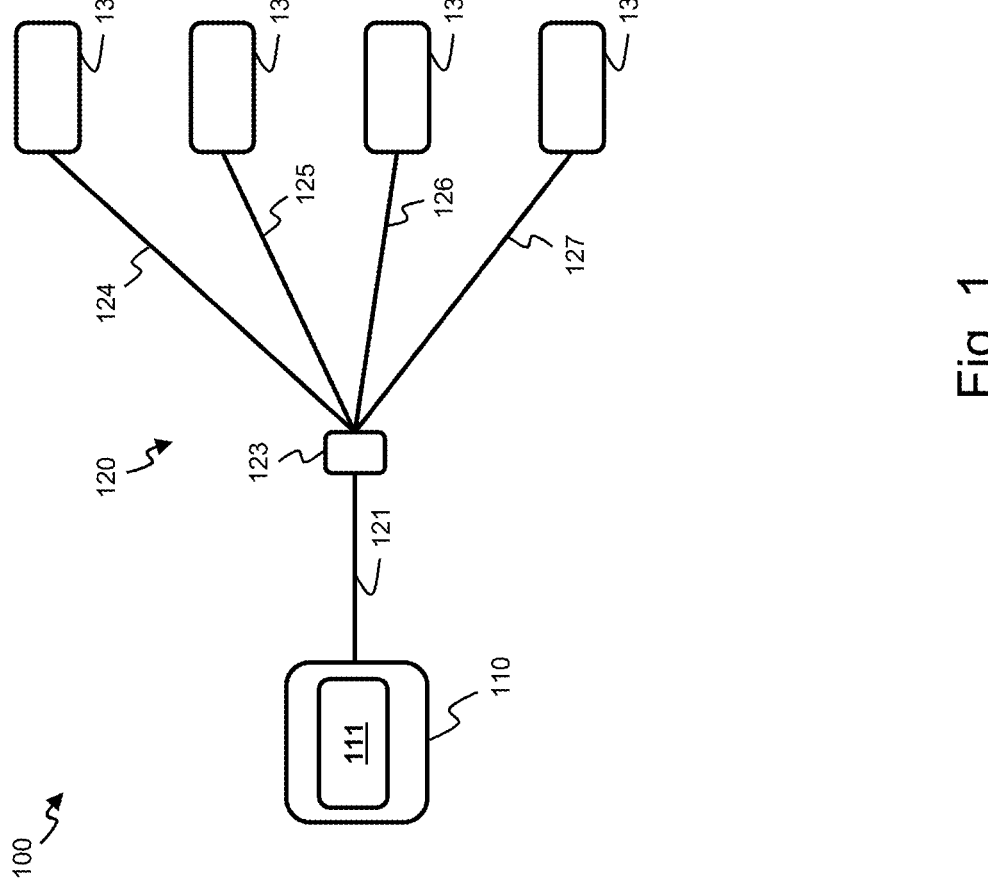
FIG. 1 shows a schematic block diagram of an example passive optical network.

FIG. 1 shows a schematic block diagram of an example point-to-multipoint optical network 100, in particular a passive optical network, PON. The optical network 100 comprises an optical line terminal 110, OLT, and a plurality of optical network units, ONUs 131, 132, 133, connected via an optical distribution network, ODN 120. In this example, the OLT 110 is connected to four ONUs 131, 132, 133, 134, however, the OLT 110 may be connected to fewer or more endpoints. The ODN 120 has a tree structure comprising an optical feeder fibre 121, one or more passive optical splitters/multiplexors 123, and a plurality of optical distribution fibres or drop fibres 124, 125, 126, 127 that connect the splitter/multiplexor 123 to the respective ONUs 131, 132, 133, 134. In the downstream, the passive optical splitter/multiplexor 123 splits the optical signal coming from the OLT 110 into lower power optical signals for the connected ONUs 131, 132, 133, 134, while in the upstream direction, the passive optical splitter/multiplexor 123 multiplexes the optical signals coming from the connected ONUs 131, 132, 133, 134 into a burst signal for the OLT 110.

The passive optical network 100 may be a Gigabit passive optical network, GPON, according to the ITU-T G.984 standard, a 10× Gigabit passive optical network, 10G-PON, according to the ITU-T G.987 standard, a 10G symmetrical XGS-PON according to the ITU-T G.9807 standard, a four-channel 10G symmetrical NG-PON2 according to the ITU-T G.989 standard, a 25GS-PON, a 50G-PON according to the ITU-T G.9804 standard, or a next generation passive optical network, NG-PON. The passive optical network 100 may implement time-division multiplexing, TDM, or time- and wavelength-division multiplexing, TWDM.

The OLT 110 further comprises a burst-mode receiver 111 configured to receive and decode upstream optical burst signals transmitted by the connected ONUs 131, 132, 133, 134. To this end, the burst-mode receiver 111 typically comprises burst-mode receiver components. The burst-mode receiver components may be analogue circuitries and/or digital circuitries. The burst-mode receiver components are typically interconnected to form a sequence or pipeline such that each burst-mode receiver component contributes to decoding the optical burst signals. As such, the burst-mode receiver 111 generates a decoded output signal, i.e. a digital signal. The decoded output signal may, for example, comprise bits, symbols, or log-likelihood ratio values, llr. This output signal may further be provided to one or more higher-layer circuitries within the OLT 110 configured to utilize or process the decoded burst data.

It can be desirable to allow ONUs 131-134 within a PON 100 to transmit optical burst signals to the OLT 110 at a plurality of different symbol rates. As such, the symbol rate of the optical burst signals received by the OLT 110, and thus the burst-mode receiver 111, may vary. Typically, digital burst-mode receiver components within a burst-mode receiver 111 are configured to operate at a fixed processing rate. Processing rate refers to the rate that input samples are processed by a respective burst-mode receiver component within the burst-mode receiver 111 and/or the rate at which output samples are generated by said component. As such, the processing rate of the burst-mode receiver components may determine the throughput of the burst-mode receiver 111, i.e. the sample rate of the decoded output signal.

Receiving multi-rate optical burst signals with typical fixed-rate digital burst-mode receiver components has the problem that lower-rate optical burst signals will be oversampled. This has the problem that the energy efficiency of the burst-mode receiver 111 is limited, as the burst-mode receiver components continuously operate at a full processing rate even when the optical burst signal has a lower rate. It is a further problem that some burst-mode receiver components may be unable to process multi-rate optical burst signals as they require an input signal at a predetermined rate. Additionally, burst-mode receivers in emerging PON systems, e.g. 50G-PON according to the ITU-T G.9804 standard, typically comprise more complex digital burst-mode receiver components involving digital signal processing functions, e.g. an equalizer. Such digital burst-mode receiver components involving digital signal processing functions may be referred to as a digital signal processing, DSP, circuitries. A burst-mode receiver comprising DSP circuitries, i.e. digital burst-mode receiver components, may be referred to as a digital burst-mode receiver.

It can thus be desirable to enable energy-efficient reception and decoding of optical burst signals having different symbol rates. The description below describes example embodiments of an optical line terminal, OLT, comprising a burst-mode receiver capable of receiving and decoding multi-rate optical burst signals in an energy-efficient manner.

Figure 2:
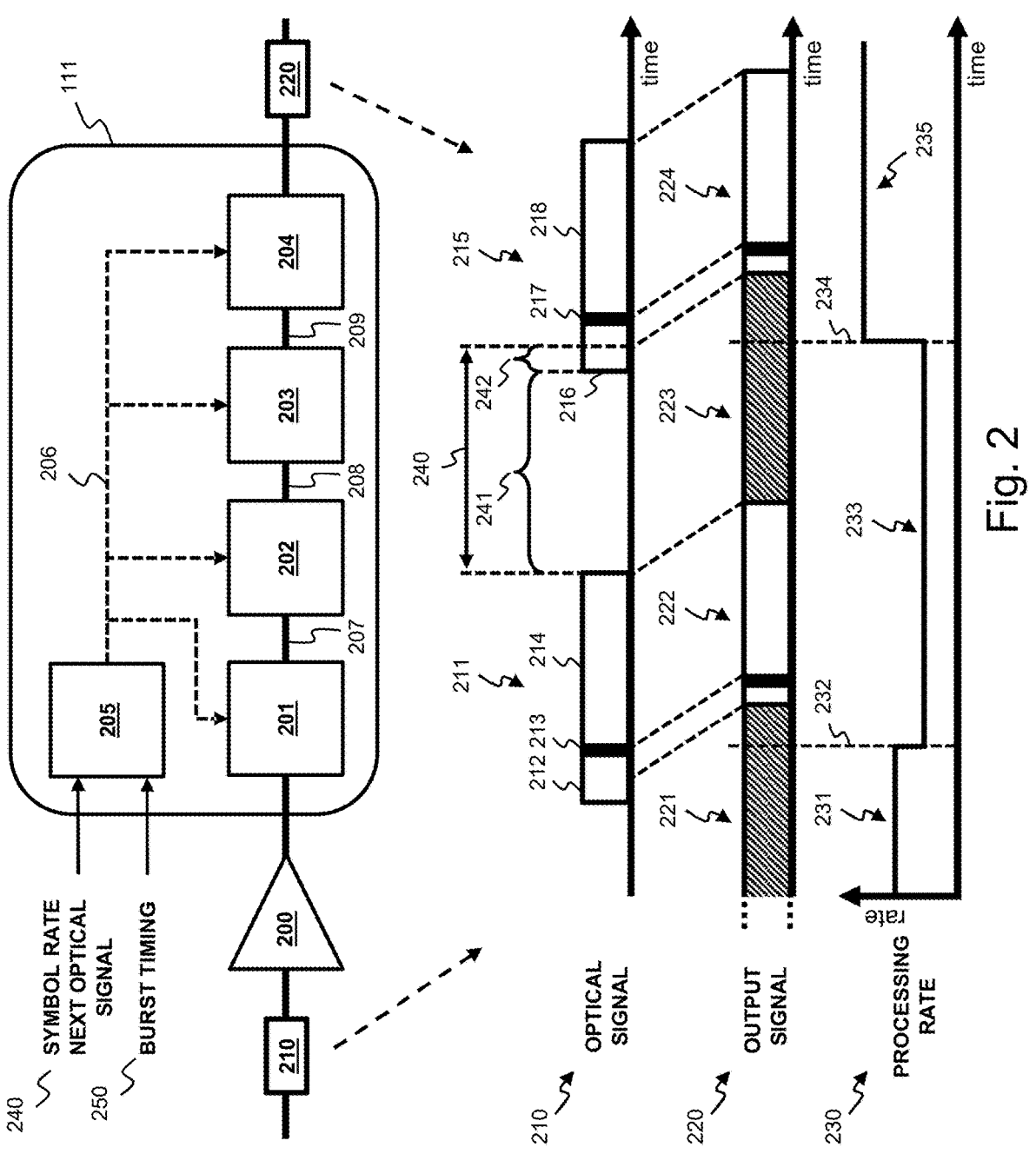
FIG. 2 shows an example embodiment of a burst-mode receiver configured to decode an optical burst signal to a decoded output signal by means of one or more digital signal processing circuitries that process a signal at respective configurable processing rates.

FIG. 2 shows an example embodiment of a burst-mode receiver 111 configured to decode an optical burst signal 210 originating from an ONU to a decoded output signal 220 by means of one or more analogue circuitries 200, and one or more digital signal processing circuitries 201, 202, 203, 204 that process a signal 210, 207, 208, 209 at respective configurable processing rates within an OLT. The optical burst signal 210 may first be processed by circuitry 200 to convert the optical signal 210 to an analogue signal such as a voltage or current. Circuitry 200 may, for example, comprise a photo-diode and a transimpedance amplifier. The digital signal processing, DSP, circuitries 201, 202, 203, 204 are interconnected such that the respective processing performed by each DSP circuitry 201, 202, 203, 204 contributes to the decoding of the optical burst signal 210 to a decoded output signal 220. In other words, the DSP circuitries 201, 202, 203, 204 form a data path of functional units for decoding optical burst signals 210 to decoded output signals 220.

The respective DSP circuitries 201, 202, 203, 204 process an input signal to an output signal at respective configurable processing rates, e.g. DSP circuitry 202 processes input signal 207 to output signal 208. A configurable processing rate of a DSP circuitry 201, 202, 203, 204 refers to the rate at which input samples are processed by the DSP circuitry and/or the rate at which output samples are generated. It will be apparent that, as the DSP circuitries 201, 202, 203, 204 form a sequence or pipeline, the output of a DSP circuitry, e.g. output signal 207 of DSP circuitry 201, may be the input of a next DSP circuitry, e.g. 202, within the data path.

The DSP circuitries 201, 202, 203, 204 may, for example, be an analogue-to-digital converter 201, a clock-and-data recovery device 202, an equalizer 203, and/or a decoder 204. It will be apparent that the configurable processing rate of DSP circuitries that receive an analogue input signal, e.g. an analogue-to-digital converter 201, may not be defined according to the rate at which input samples are processed by the DSP circuitry as the analogue input signal does not comprise digital samples. The burst-mode receiver 111 may further comprise one or more burst-mode receiver components without a configurable processing rate within the data path for decoding optical burst signals, e.g. a fixed-rate analogue burst-mode receiver component.

The burst-mode receiver 111 further comprises means 205 configured to perform obtaining a symbol rate 240 of a next optical burst signal 215. The next optical burst signal 215 is the following optical burst signal that will be received by the OLT in time, i.e. the first subsequent optical burst signal. The optical burst signal 211 preceding the next optical burst signal 215 is referred to as the previous optical burst signal 211. In other words, the previous optical burst signal 211 is the most recently received optical burst signal. The previous optical burst signal 211 and the next optical burst signal 215 are thus consecutive in time.

The optical burst signals 211, 215 may comprise a preamble 212, 216; a delimiter 213, 217; and a payload 214, 218. The delimiter 213, 217 indicates the start of the payload 214, 218. The payload 214, 218 may, for example, include message data, error correction data, parity data, control data, and idle data. The optical burst signals 211, 215 may have different symbol rates. For example, burst signal 211 may be a 25G non-return-to-zero, NRZ, signal; and burst signal 215 may be a 50G NRZ signal or a 100G PAM4 signal. Means 205 is thus configured to obtain the symbol rate 240 of the next optical burst signal 215 that is expected to arrive at the OLT, i.e. at the burst-mode receiver 111.

Obtaining this symbol rate 240 may comprise determining the symbol rate of the next optical burst signal 215 based on an upstream transmission schedule. An upstream transmission schedule may assign a symbol rate to the scheduled upstream transmissions, i.e. the optical burst signals, originating from the ONUs within a network. As the upstream transmission schedule is typically determined by the OLT or by a scheduler within the OLT, the symbol rate 240 for the next optical burst signal 215 may be straightforwardly determined from this schedule. Alternatively or complementary, the OLT may assign transmission opportunities for the received optical burst signals 210 to the respective ONUs which are associated with respective symbol rates. In other words, the OLT may associate an optical burst signal 210 with a certain ONU based on the upstream transmission schedule and the OLT may be aware of the symbol rate that is assigned to this ONU, thereby obtaining the symbol rate of the next optical burst signal.

Means 205 is further configured to perform adjusting 234, during an interval 240 between reception of valuable symbols within the previous optical burst signal 211 and the next optical burst signal 215, the configurable processing rate of one or more DSP circuitries 201, 202, 203, 204 based on the symbol rate 240 of the next optical burst signal 215.

Valuable symbols within an optical burst signal 211, 215 are symbols associated with valuable burst data 222, 224, i.e. decoded data that is valuable or relevant. Valuable symbols may include symbols corresponding to the payload 214, 218 and the delimiter 213, 217 of the optical burst signal. Additionally, valuable symbols may be included within a portion 242 of the preamble 216. The positions of the symbols that are considered valuable may be predetermined or provisioned, e.g. according to network requirements or the network protocol.

FIG. 2 illustrates an example of the configurable processing rate 230 of a DSP circuitry 201, 202, 203, 204 in time, wherein the symbol rate of the next optical burst signal 215 is higher than the symbol rate of the previous optical burst signal 211. The configurable processing rate 230 is adjusted from a lower configurable processing rate 233 to a higher configurable processing rate 235 at timestep 234 based on the symbol rate 240 of the next optical burst signal 215.

Adjusting the configurable processing rate of one or more respective DSP circuitries 201, 202, 203, 204 based on the symbol rate 240 of the next optical burst signal 215 allows optimizing the DSP circuitries for the symbol rate of the next optical burst signal. This has the advantage that the power consumption of the burst-mode receiver 111, and thus the OLT, is improved as the DSP circuitries can operate at an improved processing rate for the received optical burst signal 210. In other words, it can be avoided that an optical burst signal 210 is processed at an excessively high sampling rate by one or more DSP circuitries 201, 202, 203, 204, which consumes futile power. It is a further advantage that the respective configurable processing rates of the DSP circuitries 201, 202, 203, 204 can be adjusted in real time, i.e. between incoming optical burst signals 210.

Adjusting the configurable processing rate is performed during the interval 240 between reception of valuable symbols within consecutive optical burst signals 211, 215. Thus, during interval 240, no valuable symbols arrive or are received by the OLT and, therefore, the portion of the decoded output signal 220 associated with the interval 240 may be substantially free of valuable burst data, illustrated by periods 221 and 223 in FIG. 2.

Adjusting the configurable processing rate of one or more respective DSP circuitries 201, 202, 203, 204 during the interval 240 between reception of valuable symbols within consecutive optical burst signals 211, 215 allows avoiding that valuable symbols are decoded incorrectly, as samples within the decoded output signal 220 may be non-valid during a period following the adjusting 232, 234 of the configurable processing rate. This has the advantage that data loss and data alterations can be avoided when switching between configurable processing rates.

The interval 240 may comprise a guard time 241 between the previous optical signal 211 and the next optical signal 215. The guard time 241 is a time period that provides a safety margin against interference between consecutive optical burst signals 211, 215 arriving at the OLT. As such, no valuable burst data is received by the OLT during the guard time 241. Alternatively or complementary, the interval 240 may comprise a portion of the preamble 216 of the next optical burst signal 215. For example, an initial portion 242 of the preamble 216 of optical burst signal 215 may comprise samples for tuning the burst-mode receiver 111, i.e. non-valuable symbols of which the burst data within the decoded output signal 220 is not relevant or required.

The means 205 may further be configured to perform determining of the interval 240 based on burst timing information 250 of the optical burst signals 210. The burst timing information 250 may, for example, be a start time and a duration of the burst and this burst timing information may be comprised in an upstream transmission schedule of the OLT. The burst timing information may be provided by another circuitry within the OLT, e.g. a scheduler, or an external circuitry. This allows determining when the adjusting of a configurable processing rate can be performed without data loss.

The means 205 may comprise at least one processor and at least one memory. Computer program code may be included in the memory that, when executed by the processor, causes the means 205 to perform the adjusting of the configurable processing rate of one or more DSP circuitries based on the symbol rate of a next optical burst signal, according to embodiments. The means 205 may, for example, be a controller circuitry.

Figures 3A, 3B:
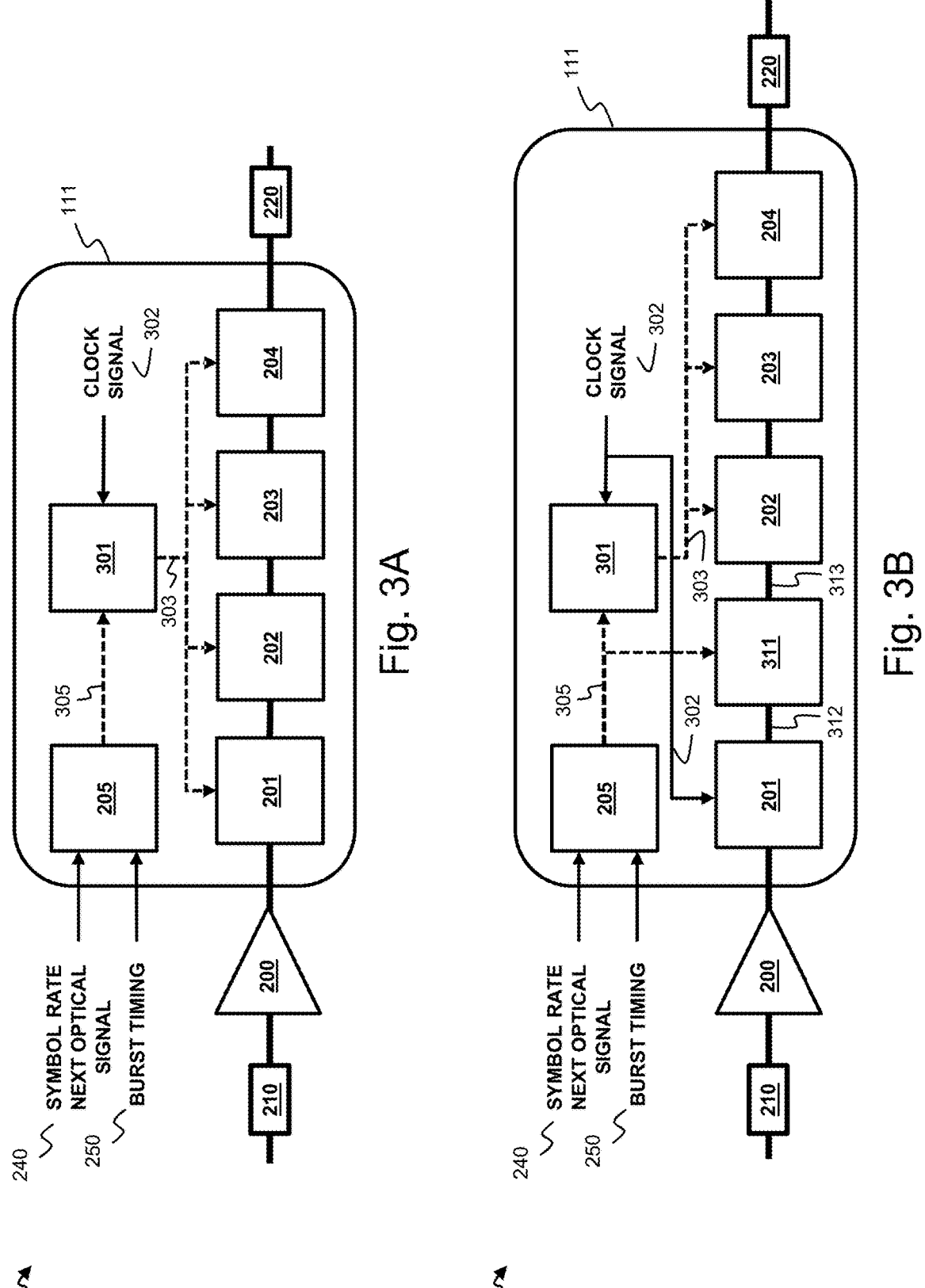
FIG. 3A shows an example embodiment of a burst-mode receiver within an OLT wherein adjusting the configurable processing rate comprises adjusting a clock frequency of one or more digital signal processing circuitries.
FIG. 3B shows an example embodiment of a burst-mode receiver that comprises a down-sampling circuitry configured to down-sample a signal.

FIG. 3A shows an example embodiment of a burst-mode receiver 111 within an OLT, wherein adjusting the configurable processing rate comprises adjusting a clock frequency of one or more DSP circuitries 201, 202, 203, 204. A clock signal 302 may be applied to the DSP circuitries 201, 202, 203, 204 that causes them to operate at a respective clock frequency, i.e. causing the DSP circuitries to process signals at a respective clock frequency. In other words, the clock signal 302 applied to the DSP circuitries 201, 202, 203, 204 may determine their configurable processing rate. Adjusting the configurable processing rate of the DSP circuitries 201, 202, 203, 204 may thus comprise adjusting the respective clock frequencies of the respective DSP circuitries.

This can be achieved by modifying the clock signal 302 that is applied 303 to the respective DSP circuitries 201, 202, 203, 204, e.g. by means of a clock divisor circuitry 301. In other words, the burst-mode receiver 111 may comprise a clock divisor circuitry 301 configured to adjust or modify the clock signal 302 that is applied to one or more of the DSP circuitries 201, 202, 203, 204. The means 205 may be configured to perform controlling of the clock divisor circuitry 301. This can be achieved by providing a control signal 305, comprising the configurable processing rate for processing the next optical burst signal, to the clock divisor circuitry 301.

It will be apparent that FIG. 3A illustrates an example embodiment wherein the clock signal 302 that is applied to all DSP circuitries 201, 202, 203, 204 is adjusted; but that the adjusted clock signal 303 may also be applied to any number of the DSP circuitries 201, 202, 203, 204. For example, FIG. 3B shows an example embodiment wherein the adjusted clock signal 303 is only applied to DSP circuitries 202, 203, and 204. The unmodified clock signal 302 may be applied to DSP circuitry 201 causing it to operate at a fixed processing rate.

As such, DSP circuitry 201 will output samples 312 at a fixed rate. To allow the other DSP circuitries 202, 203, 204 to operate at a lower configurable processing rate, the burst-mode receiver 111 may further comprise at least one down-sampling circuitry 311. The circuitry 311 may be configured to down-sample a signal 312, i.e. to convert a signal 312 with a certain rate of samples to a signal 313 with a lower rate of samples that matches the configurable processing rate of the subsequent DSP circuitries 202, 203, 204. The signal 312 that is down-sampled may be the output of a preceding interconnected DSP circuitry 201.

The means 205 may further be configured to perform controlling of the down-sampling circuitry 311 according to the desired rate of signal 313 based on the configurable processing rate of DSP circuitries 202, 203, 204. This can be achieved by providing a control signal 305, comprising the configurable processing rate for processing the next optical burst signal, to the down-sampling circuitry 311. The down-sampling circuitry 311 can be controlled by, for example, enabling the down-sampling circuitry, disabling the down-sampling circuitry, or modulating the amount of down-sampling. In other words, the down-sampling circuitry 311 may be configurable.

Figures 4A, 4B:
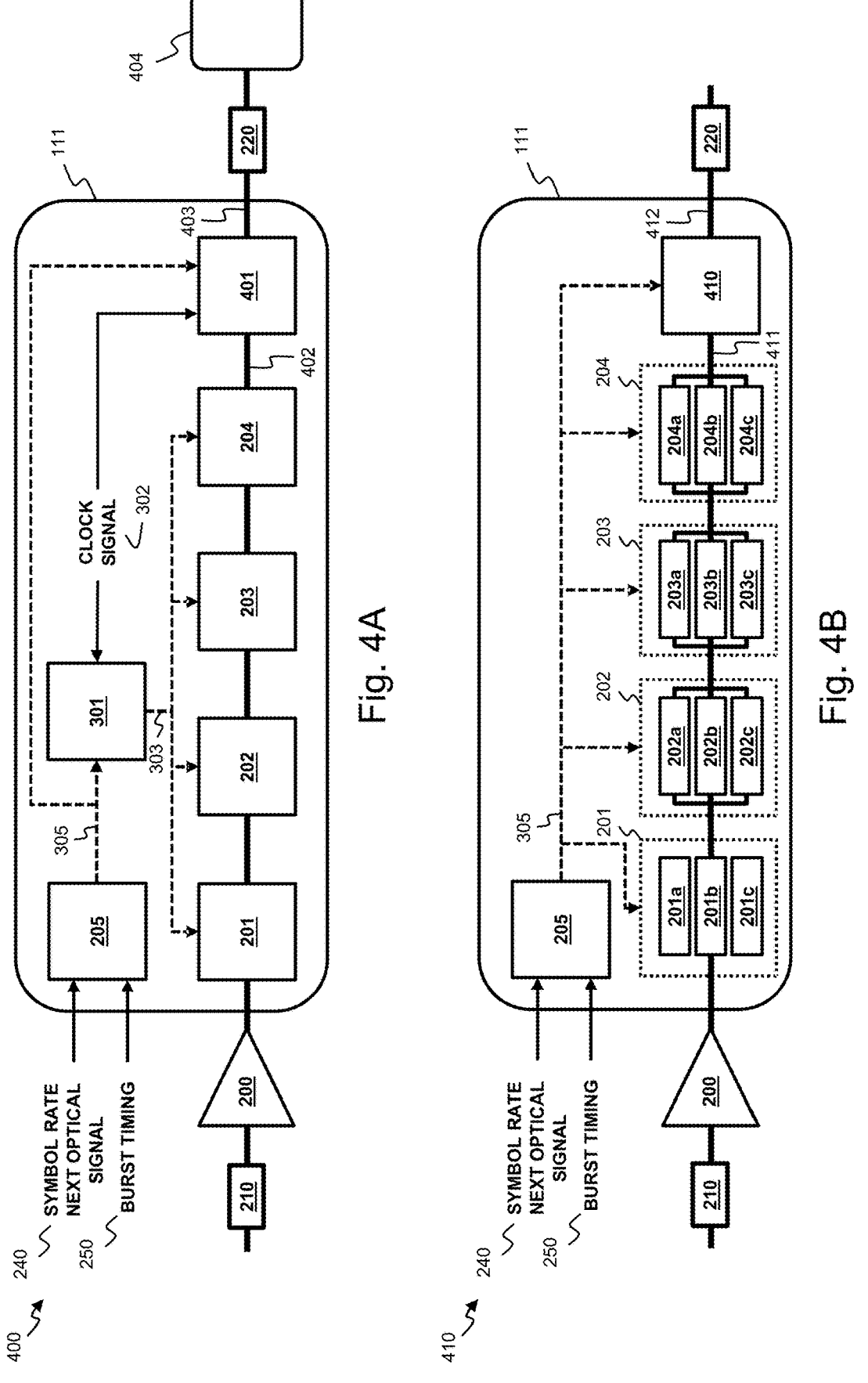
FIG. 4A shows an example embodiment of a burst-mode receiver that comprises an up-sampling circuitry configured to up-sample a signal.
FIG. 4B shows an example embodiment of a burst-mode receiver wherein adjusting the configurable processing rate comprises enabling and/or disabling one or more parallel circuitry instances of one or more digital signal processing circuitries.

FIG. 4A shows an example embodiment of a burst-mode receiver 111 within an OLT comprising at least one up-sampling circuitry 401. Up-sampling circuitry 401 may be configured to up-sample a signal 402, i.e. to convert a signal 402 with a certain rate of samples to a signal 403 with a higher rate of samples. In the example embodiment illustrated in FIG. 4A, the up-sampling circuitry is provided at the end of the processing data path or pipeline. This allows up-sampling signal 402 to a suitable rate for further circuitries 404 within the OLT that are connected to the burst-mode receiver 111, e.g. higher-layer processing circuitries and/or interface circuitries within the OLT. Alternatively or complementary, an up-sampling circuitry 401 may be provided prior to a burst-mode receiver component or DSP circuitry that requires an input signal at a predetermined rate, e.g. between DSP circuitry 201 and DSP circuitry 202. In other words, the up-sampling circuitry may be configured to up-sample a signal to a predetermined sampling rate which depends on the recipient of the up-sampled signal, e.g. a further circuitry 404, a burst-mode receiver component, or a DSP circuitry.

The means 205 may further be configured to perform controlling of the up-sampling circuitry 401 according to the desired rate of signal 403. This can be achieved by providing a control signal 305, comprising the configurable processing rate for processing the next optical burst signal, to the up-sampling circuitry 401. The up-sampling circuitry 401 can be controlled by, for example, enabling the up-sampling circuitry, disabling the up-sampling circuitry, or modulating the amount of up-sampling. In other words, the up-sampling circuitry 401 may be configurable.

The up-sampling circuitry 401 may further be configured to up-sample a signal to a predetermined sampling rate. The predetermined sampling rate may be determined by the circuitry or processing block that receives the up-sampled signal 403, e.g. a next burst-mode receiver component within the data path, a next DSP circuitry 201, 202, 203, 204 within the data path, a higher-layer processing circuitry 404 within the OLT, or an interface circuitry 404 between the burst-mode receiver and a higher-layer processing circuitry within the OLT.

FIG. 4B shows an example embodiment of a burst-mode receiver 111 within an OLT, wherein adjusting the configurable processing rate comprises enabling and/or disabling one or more parallel circuitry instances 201*a*, 201*b*, 201*c*, 202*a*, 202*b*, 202*c*, 203*a*, 203*b*, 203*c*, 204*a*, 204*b*, 204*c* of one or more DSP circuitries 201, 202, 203, 204.

In other words, a respective DSP circuitry 201, 202, 203, 204 within the burst-mode receiver 111 may include one or more parallel circuitry instances of said digital signal processing circuitry. The respective parallel circuitry instances 201*a*, 201*b*, 201*c*, 202*a*, 202*b*, 202*c*, 203*a*, 203*b*, 203*c*, 204*a*, 204*b*, 204*c* may operate at a nominal clock speed or frequency, i.e. a fixed processing rate. Enabling or disabling parallel circuitry instances of a respective DSP circuitry in the signal data path thus allows to respectively increase or decrease the configurable processing rate of the respective digital signal processing circuitry, i.e. allows adjusting the configurable processing rate of the DSP circuitry 201, 202, 203, 204.

For example, enabling all three parallel circuitry instances 204*a*, 204*b*, 204*c* of DSP circuitry 204 results in DSP circuitry 204 operating at a maximal configurable processing rate. Disabling one parallel circuitry instance, e.g. 204*a*, may lower the configurable processing rate by a third, while disabling two parallel circuitry instances, e.g. 204*a* and 204*b*, may lower the configurable processing rate by two thirds.

It will be apparent that the configurable processing rate of one or more DSP circuitries 201, 202, 203, 204 within the burst-mode receiver 111 may be adjusted by adjusting the clock frequency as described in relation to FIG. 3A and FIG. 3B; and that the configurable processing rate of the other DSP circuitries 201, 202, 203, 204 within the receiver 111 may be adjusted by enabling and/or disabling parallel circuitry instances as described in relation to FIG. 4B. It will further be apparent that the configurable processing rate of a DSP circuitry, e.g. 202, may be adjusted by a combination of adjusting the clock frequency of that DSP circuitry, and enabling and/or disabling parallel circuitry instances 202*a*, 202*b*, 202*c* of that DSP circuitry.

When adjusting the configurable processing rate of a DSP circuitry 201, 202, 203, 204, the latency or processing delay of that DSP circuitry 201, 202, 203, 204 can change. For example, increasing the configurable processing rate may decrease the latency. As such, the burst-mode receiver 111 may further comprise at least one latency compensator circuitry 401, 410 configured to adjust the latency of a signal 402, 411, i.e. increase and/or decrease the latency of signal 402, 411. This allows compensating for a change in latency when adjusting the configurable processing rate of one or more DSP circuitries 201, 202, 203, 204. It will be apparent that circuitry 401 in FIG. 4A may also be a latency compensator circuitry alternative to, or in addition to, an up-sampling circuitry.

In the example embodiments illustrated in FIG. 4A and FIG. 4B, the latency compensator circuitry 401, 410 is provided at the end of the processing data path or pipeline of the burst-mode receiver 111. This allows compensating for a change in end-to-end latency of the burst-mode receiver 111 associated with adjusting the configurable processing rate of one or more DSP circuitries 201, 202, 203, 204. The end-to-end latency of the digital burst-mode receiver 111 may refer to the processing time for decoding a symbol within the optical burst signal 210 to one or more bits within the decoded output signal 220. This has the advantage that the latency or processing delay of the burst-mode receiver 111 can be controlled. This has the further advantage that the latency or processing delay of the burst-mode receiver 111 can be substantially stable in time, i.e. remain constant, when adjusting the configurable processing rates of one or more DSP circuitries 201, 202, 203, 204. The latency compensator circuitry 401, 410 may further be configured to adjust the latency of a signal to a predetermined latency based on the recipient of the latency-adjusted signal, e.g. a further circuitry 404, or a DSP circuitry.

Figure 5A:
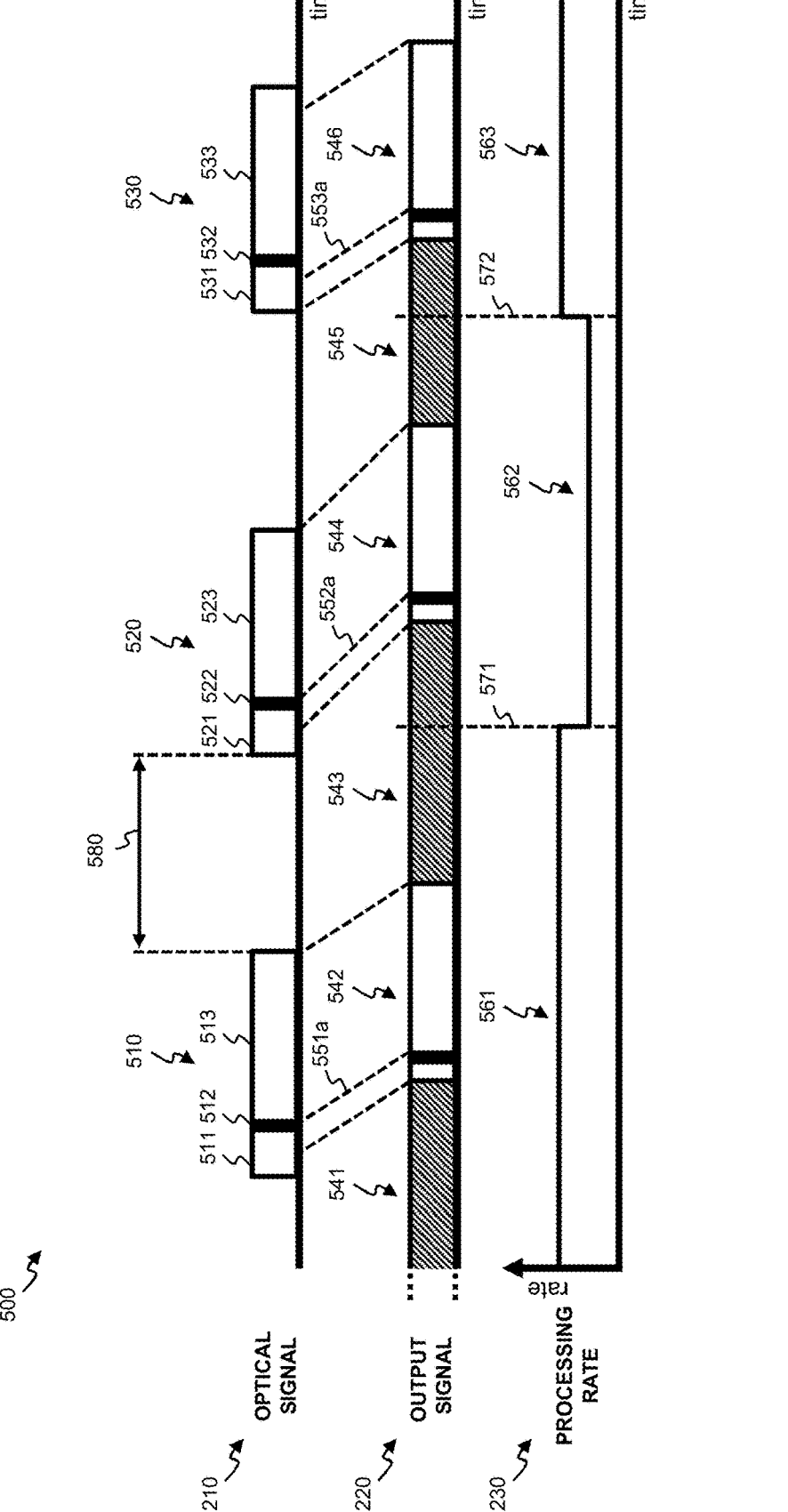
FIG. 5A shows an example of the change in end-to-end latency of the burst-mode receiver due to adjusting of a configurable processing rate of one or more digital signal processing circuitries within a burst-mode receiver.

FIG. 5A shows an example of the change in end-to-end latency 551*a*, 552*a*, 553*a* of the burst-mode receiver due to adjusting the configurable processing rates 561, 562, 563 of one or more of the DSP circuitries within the burst-mode receiver without a latency compensator circuitry. At timestep 571, i.e. during an interval between reception of valuable symbols within a previous optical burst signal 510 and a next optical burst signal 520, the configurable processing rate 230 of one or more DSP circuitries may be lowered from processing rate 561 to processing rate 562. This results in a change in end-to-end latency, i.e. an increase in processing delay, from latency 551*a* to latency 552*a*. Similarly, increasing the configurable processing rate 230 of one or more DSP circuitries at timestep 572 from processing rate 562 to processing rate 563 may result in a change in end-to-end latency, i.e. a decrease in processing delay, from latency 552*a* to latency 553*a*.

Figure 5B:
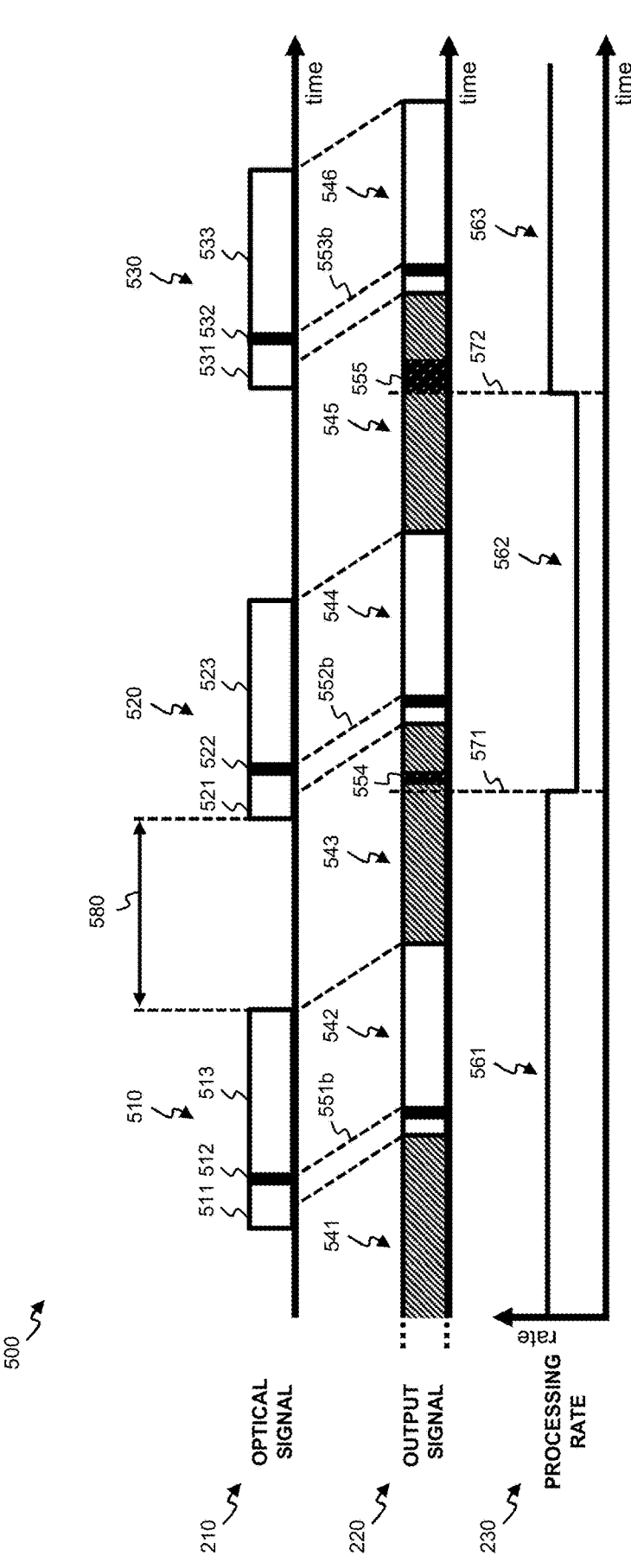
FIG. 5B shows an example of the end-to-end latency adjustment performed by a latency compensator circuitry within a burst-mode receiver, according to embodiments.

FIG. 5B shows an example of the latency adjustment performed by latency compensator circuitry 410. The latency compensator circuitry may be configured to perform, during the interval between reception of valuable symbols within a previous optical burst signal 510 and the next optical burst signal 520, dropping 554 one or more non-payload samples 543 from the decoded output signal 220. Non-payload samples 543 may be the samples or bits included in the portion of the decoded output signal 220 associated with the interval, i.e. portion 543. In doing so, the end-to-end latency 551*b*, 552*b* can be maintained when adjusting the configurable processing rate. This allows compensating for the change in end-to-end latency without substantial system impact, e.g. without impacting further circuitries within the OLT that are connected to the burst-mode receiver 111.

The latency compensator circuitry 410 may further be configured to perform, during the interval between reception of valuable symbols within a previous optical burst signal 520 and the next optical burst signal 530, inserting one or more dummy samples 555 within the decoded output signal 220. The dummy samples 555 may thus be inserted within the portion of the decoded output signal 220 associated with the interval, i.e. portion 545. In doing so, the end-to-end latency 552*b*, 553*b* can be maintained when adjusting the configurable processing rate. This allows compensating for the change in end-to-end latency without substantial system impact, e.g. without impacting downstream circuitries within the OLT that are connected to the burst-mode receiver 111.

It is a further advantage that data loss and data alterations can be avoided when adjusting the latency, as the inserting of dummy samples 554 or the dropping of non-payload samples 555 is performed during the interval which is free of valuable symbols.

Adjusting the configurable processing rate of one or more DSP circuitries between a highest and a lowest processing rate supported by the OLT may result in a maximal change in end-to-end latency of the burst-mode receiver. As such, the OLT may further be configured to perform scheduling a guard time 580 between consecutive optical burst signals 510, 520 with a minimal length such that the decoded output signal 220 comprises at least sufficient non-payload bits 545 to compensate for a change in end-to-end latency of the burst-mode receiver associated with adjusting the configurable processing rate between a highest processing rate supported by the OLT and a lowest processing rate supported by the OLT. In other words, the guard time 580 may be scheduled such that dropping all necessary samples within the guard time allows compensating this maximal change in end-to-end latency.

Returning to FIG. 4B, it will be apparent that the latency compensator circuitry 410 may also be provided at another position within the processing data path or pipeline of the burst-mode receiver 111, e.g. between DSP circuitry 202 and 203.

As such, the dummy samples inserted by the latency compensator circuitry 410 may be any unit of data depending on the signal upon which the latency adjustment is performed. For example, when inserting dummy samples within the decoded output signal 220, the dummy samples may be dummy bits or dummy symbols depending on whether the decoded output signal comprises bits or symbols. Likewise, the non-payload samples dropped by the latency compensator circuitry 410 may be any unit of data depending on the signal upon which the latency adjustment is performed, e.g. non-payload bits, or non-payload symbols.

The means 205 may further be configured to perform controlling of the latency compensator circuitry 410 according to the desired latency of the signal, e.g. by enabling the latency compensator circuitry, disabling the latency compensator circuitry, or modulating the amount of latency adjustment. In other words, the latency compensator circuitry may be configurable.

Figure 6:
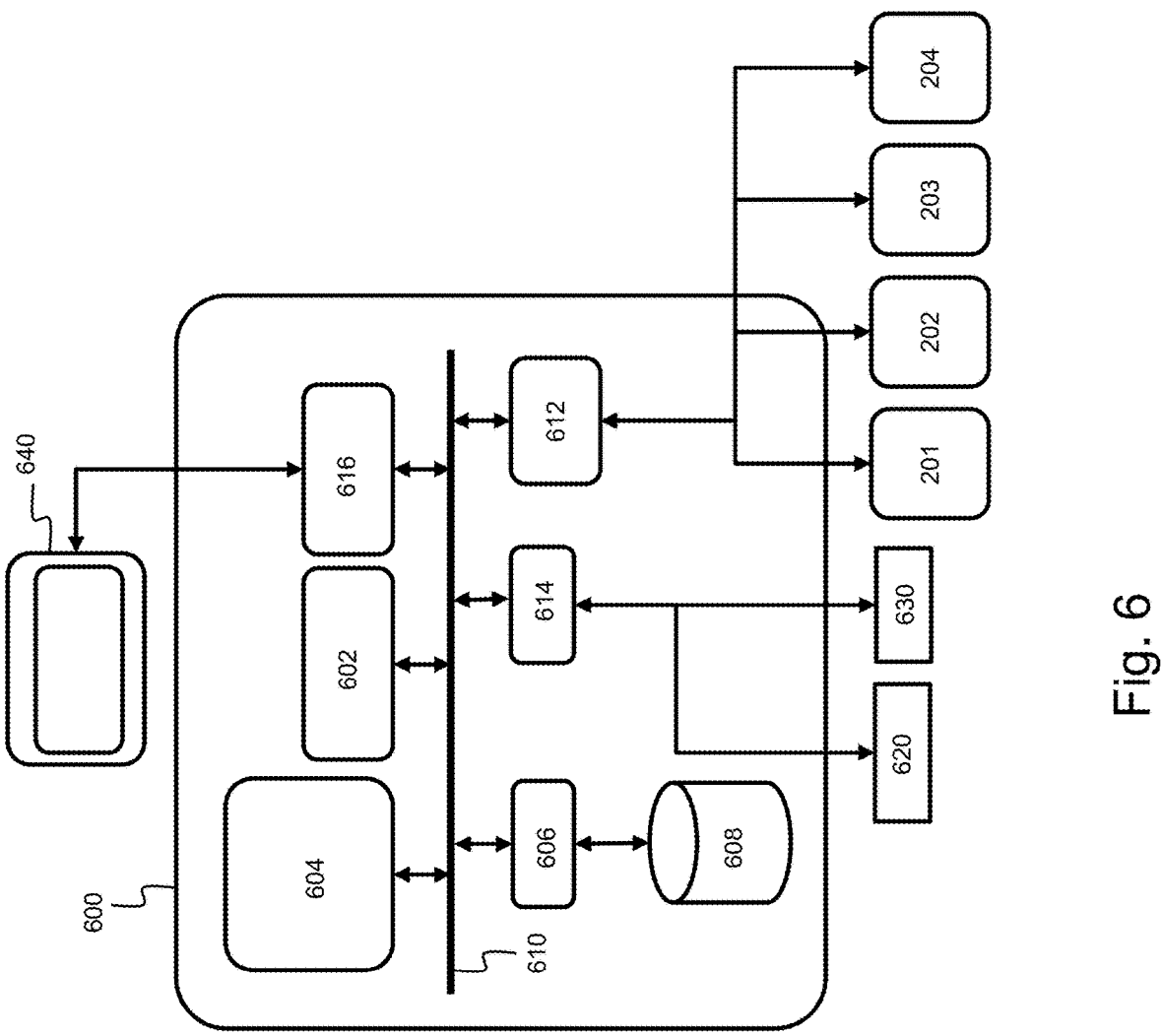
FIG. 6 shows an example embodiment of a suitable computing system for performing one or several steps in embodiments of the invention.

FIG. 6 shows a suitable computing system 600 enabling to implement embodiments of the method for managing the tuning of one or more burst-mode receiver components in an optical line terminal. Computing system 600 may in general be formed as a suitable general-purpose computer and comprise a bus 610, a processor 602, a local memory 604, one or more optional input interfaces 614, one or more optional output interfaces 616, a communication interface 612, a storage element interface 606, and one or more storage elements 608. Bus 610 may comprise one or more conductors that permit communication among the components of the computing system 600. Processor 602 may include any type of conventional processor or microprocessor that interprets and executes programming instructions. Local memory 604 may include a random-access memory (RAM) or another type of dynamic storage device that stores information and instructions for execution by processor 602 and/or a read only memory (ROM) or another type of static storage device that stores static information and instructions for use by processor 602. Input interface 614 may comprise one or more conventional mechanisms that permit an operator or user to input information to the computing device 600, such as a keyboard 620, a mouse 630, a pen, voice recognition and/or biometric mechanisms, a camera, etc. Output interface 616 may comprise one or more conventional mechanisms that output information to the operator or user, such as a display 640, etc. Communication interface 612 may comprise any transceiver-like mechanism such as for example one or more Ethernet interfaces that enables computing system 500 to communicate with other devices and/or systems, for example with one or more DSP circuitries 201, 202, 203, 204. The communication interface 612 of computing system 600 may be connected to such another computing system by means of a local area network (LAN) or a wide area network (WAN) such as for example the internet. Storage element interface 606 may comprise a storage interface such as for example a Serial Advanced Technology Attachment (SATA) interface or a Small Computer System Interface (SCSI) for connecting bus 610 to one or more storage elements 608, such as one or more local disks, for example SATA disk drives, and control the reading and writing of data to and/or from these storage elements 608. Although the storage element(s) 608 above is/are described as a local disk, in general any other suitable computer-readable media such as a removable magnetic disk, optical storage media such as a CD or DVD, -ROM disk, solid state drives, flash memory cards, . . . could be used. Computing system 600 could thus correspond to the controller circuitry 205 in the embodiments illustrated by FIG. 2.

As used in this application, the term "circuitry" may refer to one or more or all of the following:

(a) hardware-only circuit implementations such as implementations in only analog and/or digital circuitry and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An optical line terminal, OLT, configured to communicate in a passive optical network with one or more optical network units, ONUs; wherein optical burst signals transmitted by the one or more ONUs have respective symbol rates; and wherein the optical line terminal comprises a burst-mode receiver configured to decode an optical burst signal from an ONU to a decoded output signal by one or more digital signal processing circuitries that process a signal at respective configurable processing rates; the optical line terminal comprising:

at least one memory configured to store program instructions; and at least one processor configured to execute the program instructions and cause the optical line terminal to perform, obtaining the symbol rate of a next optical burst signal; and adjusting, during an interval between reception of valuable symbols within a previous optical burst signal and the next optical burst signal, the configurable processing rate of one or more digital signal processing circuitries based on the symbol rate of the next optical burst signal.

2. The optical line terminal, OLT, according to claim 1, wherein the interval comprises a guard time between a previous optical burst signal and a next optical burst signal; and/or a portion of a preamble within the next optical burst signal.

3. The optical line terminal, OLT, according to claim 1, wherein the adjusting the configurable processing rate of one or more digital signal processing circuitries comprises adjusting a clock frequency of the one or more digital signal processing circuitries.

4. The optical line terminal, OLT, according to claim 1, wherein the adjusting the configurable processing rate of a respective digital signal processing circuitry of the one or more digital signal processing circuitries comprises enabling and/or disabling one or more parallel circuitry instances of the respective digital signal processing circuitry.

5. The optical line terminal, OLT, according to claim 1, wherein the burst-mode receiver further comprises at least one down-sampling circuitry configured to down-sample a signal.

6. The optical line terminal, OLT, according to claim 5, wherein the optical line terminal is further caused to perform controlling the at least one down-sampling circuitry, at least one up-sampling circuitry, and/or at least one latency compensator circuitry based on the symbol rate of the next optical burst signal.

7. The optical line terminal, OLT, according to claim 1, wherein the burst-mode receiver further comprises at least one up-sampling circuitry configured to up-sample a signal.

8. The optical line terminal, OLT, according to claim 7, wherein the up-sampling circuitry is further configured to up-sample a signal to a predetermined data rate, or wherein a latency compensator circuitry is further configured to adjust the latency of a signal to a desired latency.

9. The optical line terminal, OLT, according to claim 1, wherein the burst-mode receiver further comprises at least one latency compensator circuitry configured to adjust a latency of a signal.

10. The optical line terminal, OLT, according to claim 9, wherein the latency compensator circuitry is further configured to perform, during the interval between reception of valuable symbols within a previous optical burst signal and the next optical burst signal, inserting one or more dummy samples within a signal or dropping one or more non-payload samples from a signal.

11. The optical line terminal, OLT, according to claim 1, wherein the one or more digital signal processing circuitries are selected from the group comprising an analogue-to-digital converter, a clock-and-data recovery device, an equalizer, and/or a decoder.

12. The optical line terminal, OLT, according to claim 1, wherein the optical line terminal is further caused means to perform determining of the interval between reception of valuable symbols within a previous optical burst signal and the next optical burst signal based on burst timing information of the optical burst signals.

13. The optical line terminal, OLT, according to claim 1, wherein obtaining the symbol rate of the next optical burst signal further comprises determining the symbol rate based on an upstream transmission schedule.

14. A method comprising:

obtaining a symbol rate of a next optical burst signal; and adjusting, during an interval between reception of valuable symbols within a previous optical burst signal and the next optical burst signal, a configurable processing rate of one or more digital signal processing circuitries within an optical line terminal, OLT, based on the symbol rate of the next optical burst signal.

15. A non-transitory computer-readable medium storing instruction, which when executed by a processor, cause an apparatus including the processor to perform the method of claim 14.

* * * * *